United States Patent
Mikhailov et al.

(10) Patent No.: US 9,979,794 B2
(45) Date of Patent: May 22, 2018

(54) ENTROPY SHARING IN A LARGE DISTRIBUTED SYSTEM BASED ON ENTROPY VERIFICATION BY AN ENTROPY BROKER

(71) Applicant: Ericsson AB, Stockholm (SE)

(72) Inventors: Mikhail Mikhailov, Newton, MA (US); Raj Nair, Lexington, MA (US)

(73) Assignee: Ericsson AB, Stockholm (SE)

( * ) Notice: Subject to any disclaimer, the term of this patent is extended or adjusted under 35 U.S.C. 154(b) by 190 days.

(21) Appl. No.: 14/856,863

(22) Filed: Sep. 17, 2015

(65) Prior Publication Data

US 2017/0085654 A1    Mar. 23, 2017

(51) Int. Cl.
| | | |
|---|---|---|
| *G06F 15/16* | (2006.01) | |
| *H04L 29/08* | (2006.01) | |
| *G06F 7/76* | (2006.01) | |
| *H04L 29/06* | (2006.01) | |
| *G06F 7/58* | (2006.01) | |
| *H04L 9/08* | (2006.01) | |
| *H04W 4/00* | (2018.01) | |

(52) U.S. Cl.
CPC .............. *H04L 67/16* (2013.01); *G06F 7/58* (2013.01); *G06F 7/76* (2013.01); *H04L 9/0869* (2013.01); *H04L 63/123* (2013.01); *H04L 2209/26* (2013.01); *H04W 4/005* (2013.01)

(58) Field of Classification Search
CPC ..... H04L 67/16; H04L 9/0662; H04L 9/0869; G06F 7/58; G06F 7/588
See application file for complete search history.

(56) References Cited

U.S. PATENT DOCUMENTS

| | | | | |
|---|---|---|---|---|
| 6,047,242 A | * | 4/2000 | Benson | G06F 21/10 380/277 |
| 6,678,665 B1 | * | 1/2004 | Benson | G06F 21/10 705/51 |
| 9,805,193 B1 | * | 10/2017 | Salsamendi | G06F 21/566 |
| 2008/0256151 A1 | | 10/2008 | Acar et al. | |
| 2009/0161876 A1 | * | 6/2009 | Sherkin | H04L 9/3066 380/278 |
| 2009/0164774 A1 | * | 6/2009 | Sherkin | H04L 9/3066 713/155 |
| 2014/0244785 A1 | | 8/2014 | Potlapally et al. | |
| 2014/0351587 A1 | * | 11/2014 | Dash | G06F 21/44 713/165 |
| 2015/0058841 A1 | | 2/2015 | Krempa et al. | |
| 2015/0301803 A1 | * | 10/2015 | Boenisch | G06F 7/588 380/46 |

(Continued)

OTHER PUBLICATIONS

Simtec Electronics Entropy Key: USB True Random Number Generator. http://www.entropykey.co.uk.

(Continued)

Primary Examiner — Mohamed A Wasel

(57) ABSTRACT

Methods and apparatus for sharing entropy between an entropy broker and various devices wherein the entropy broker receives a communication from a client. Responsive to determining that the client provided entropy, the entropy broker tests the provided entropy for randomness and stores provided entropy that passes verification and responsive to determining that the client requested entropy, the entropy broker adds the client to an entropy queue.

18 Claims, 7 Drawing Sheets

(56) References Cited

U.S. PATENT DOCUMENTS

2016/0267529 A1* 9/2016 Jakobsson .......... G06Q 30/0241
2016/0342394 A1* 11/2016 Tsirkin .................... G06F 7/588
2017/0011420 A1* 1/2017 Sullivan ............. G06Q 30/0254

OTHER PUBLICATIONS

TrueRNG—Hardware Random Number Generator. http://ubld.it/products/truerng-hardware-random-number-generator/.
Wikipedia: Comparison of hardware random number generators. http://en.wikipedia.org/wiki/Comparison_of_hardware_random_number_generators.
Rohe, Markus: "RANDy—A True-Random Generator Based on Radioactive Decay". Saarland University. 2003. http://citeseerx.ist.psu.edu/viewdoc/download?doi=10.1.1.110.9725&rep=rep1&type=pdf.
McEvoy, et al.: Fortuna: Cryptographically Secure Pseudo-Random Number Generation in Software and Hardware. University of College Cork, Ireland. 2006. http://www.academia.edu/410608/Fortuna_A_Cryptographically_Secure_Pseudo-Random_Number_Generation_In_Software_And_Hardware.
Wikipedia: "Sorensen—Dice coefficient". http://en.wikipedia.org/wiki/S%C3%B8rensen%E2%80%93Dice_coefficient.
Wikipedia: "Hamming distance". http://en.wikipedia.org/wiki/Hamming_distance.

* cited by examiner

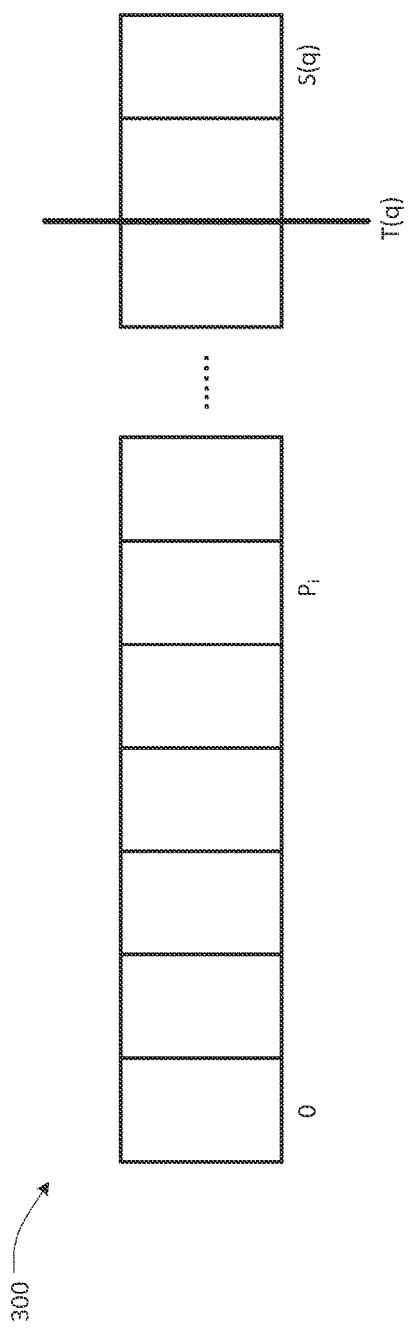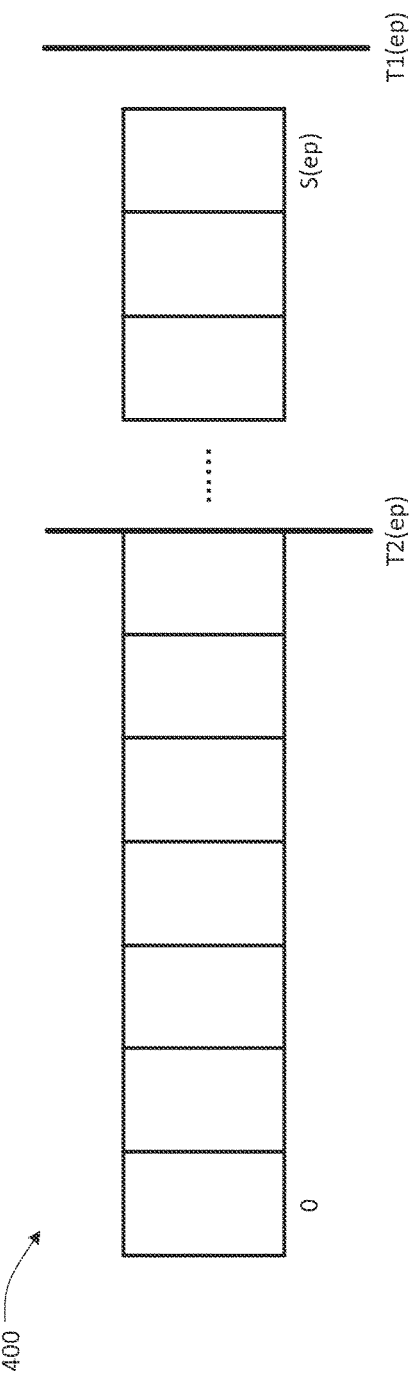

US 9,979,794 B2

ENTROPY SHARING IN A LARGE DISTRIBUTED SYSTEM BASED ON ENTROPY VERIFICATION BY AN ENTROPY BROKER

FIELD OF THE DISCLOSURE

The present disclosure generally relates to the provision of entropy to applications that require random numbers. More particularly, and not by way of any limitation, the present disclosure is directed to a system and method for sharing entropy between clients and an entropy broker.

BACKGROUND

In information theory, entropy is a property of randomness. A device may have the capability to harvest random events, such as the timing of keystrokes or the movement of a gyroscope, to use as inputs to a Random Number Generator (RNG). Many applications face the important and non-trivial problem of obtaining enough entropy or randomness to generate random values, such as encryption keys. One such application is the generation of content encryption keys, session encryption keys, or other keys for over-the-top (OTT) delivery of Video On Demand (VOD) as well as live content. The problem is more acute if content encryption keys change periodically, e.g., key rotation, or if the provider uses private copies where individual viewers may be getting their own private version of content. Another application is the generation and frequent rotation of channel encryption keys in the context of Conditional Access (CA) systems, managed networks, cloud-based TV deployments, linear TV and IPTV. Yet another application is the generation of random nonces and keys for the purpose of file and message encryption or for the generation of encryption keys. One can further envision applications anywhere where random data is required, such as multi-player on-line and distributed games.

Traditional approaches to gathering entropy in computing systems involve monitoring, collecting, and aggregating various random events, such as mouse movements, timing between interrupts and disk I/O, etc. Server systems, such as in data centers and cloud server farms, that lack user interaction via a console, a Graphic User Interface (GUI), or a remote login lack some of these sources of random data. A typical server system does not have enough high-quality entropy to generate the required amount of random data even for applications that are not particularly demanding. For that reason, UNIX systems (Linux) usually provide applications with two interfaces for obtaining random data: 1) a pseudo-random non-blocking device /dev/urandom, and 2) a higher quality but blocking device /dev/random. The former device outputs data that is not truly random and is thus inappropriate for serious applications, such as encryption of premium video content. The latter device provides cryptographically strong random data but is blocking and, by itself, cannot be used to support a large scale deployment.

The scheme described above can be improved upon in known ways. One approach is to use the small amount of random data available in /dev/random and feed it through a cryptographically strong random number generator, such as CTR-DRBG, to produce a larger amount of high quality random data. Use of this approach requires the periodic reseeding of CTR-DRBG from /dev/random. This approach helps and could work for smaller deployments with pre-caching, i.e., the generation of random data before it is actually needed; however, it is not appropriate for larger scale deployments. Another approach is to outfit servers with hardware random number generators, such as one of the devices below, which are only a sampling of the available devices:

The Entropy Key by Simtec Electronics;
The TrueRNG by ubld.it; and
BitBabbler Black or BitBabbler White by BitBabbler.

A random number generator based on radioactive decay has even been proposed in a paper titled "RANDy—A True-Random Generator Based On Radioactive Decay" by Markus Rohe, although it is unclear whether the latter is commercially available.

While many of the available RNG may be of interest to researchers or more appropriate for small deployments, they may not work for large server farms due to cost or other issues. For example, each of the available hardware random number generators listed above comes in the form of a USB key and may not be easily used in a server appliance without custom modifications.

If using a 3rd party hardware RNG is not possible for some reason and there are concerns that /dev/random supplies entropy that is of low quality (plus /dev/random is a blocking device), one may choose to implement an entropy pool manager, such as Fortuna. Fortuna is a pseudo-random number generation algorithm, originally written by N. Ferguson and B. Schneier and published in *Practical Cryptography*, Wiley Publishing, Inc., 2003. The algorithm was specifically designed to be cryptographically secure from known attacks. An implementation of Fortuna is discussed in "Fortuna: Cryptographically Secure Pseudo-Random Number Generation In Software And Hardware" by McEvoy et al., *ISSC* 2006, *Dublin Institute of Technology*, June 28-30. In fact, one may decide to use entropy from /dev/random as just one pool and find and add other sources of entropy and have Fortuna manage these. Of course, if a given server system fails to generate high-quality entropy for /dev/random, it may be non-trivial to find alternative and better sources of entropy there.

Although generating enough high quality entropy on a server system may be difficult, generating enough high quality entropy may be even more problematic on the client side. This may be especially true if the client device is a handheld device, such as a smart phone, smart watch, set top box, smart television or some other such client device, even though a server requires substantially more entropy than any client device. Unlike a server system, providing a high-quality hardware random number generator can be even more problematic in client devices due to lower cost and smaller form factor of these devices. For example, while Android is Linux-based, Android is known to lack a quality random number generator. Also, in many cases, audits of secure solutions require designers to know exactly what sources of entropy are, while closed or proprietary client devices, such as iOS or Windows, may not disclose that information. One could once again consider utilizing an entropy pool manager, such as Fortuna, on a client device, and creating entropy pools from various physical devices, such as audio microphone, accelerometers, etc., which are available on the client device. A complication to this approach is that many client devices require applications requesting access to these physical devices to get an explicit authorization from the end user, and end users may block applications from accessing these devices, in which case the application will not be able to obtain any entropy.

SUMMARY

The present patent disclosure is broadly directed to systems, methods, devices, and associated non-transitory computer-readable media for sharing entropy between client devices and/or servers through the mechanism of an entropy broker. Each of the physical devices, e.g., microphone, accelerometer, camera, etc., on a client device can be viewed as a pool of entropy. An entropy manager on a client device that is allowed to access these hardware devices can gather entropy and can share entropy in excess of the client device's own needs with the entropy broker. Multiple entropy managers, running on multiple client devices provide a pool of entropy to the entropy broker, which can then share the collected entropy with entropy managers running on a server or client device that does not have an adequate entropy pool. In other words, various client devices and/or servers can receive entropy not only from the device's own local events, such as interrupts, disk I/O, etc., but also from various random events, including user-initiated events, happening on a multitude of clients and servers. For example, if a client device has few or no randomness-generating devices (e.g., camera, gyroscope, GPS, etc.), or the user did not authorize access to such randomness-generating devices, the entropy broker can provide the required amount of randomness to that device.

It is important for the actual entropy used to generate random numbers to be unknown to a potential attacker. For that reason, any entropy collected on client devices and/or sent to client devices from the entropy broker must be carefully guarded. Protection can be provided using a Digital Rights Management (DRM) system, such as Ericsson DRM, PlayReady, Widevine, etc., by extending the DRM system to incorporate the sharing of entropy between clients, servers and entropy brokers. A secure client, e.g., a DRM client, running on the client device can issue separate requests to provide or receive entropy from the entropy broker, which may be co-located with a server.

Clients can also accumulate entropy and store the entropy locally in a secure fashion, such as in a secure storage or an encrypted file. A client can store entropy even if the client is offline. Furthermore, clients can receive more entropy from the entropy broker than they need immediately, and store the entropy locally in a similar fashion to use as needed.

In one aspect, an embodiment of a method for sharing entropy at an entropy broker is disclosed. The claimed method comprises, inter alia, receiving a communication from a client; responsive to determining that the client provided entropy, processing the provided entropy; and responsive to determining that the client requested entropy, adding the client to an entropy queue.

In another aspect, an embodiment of a method for sharing entropy at a device is disclosed. The claimed embodiment involves, inter alia, securely collecting entropy at the device; determining whether the device has collected enough entropy for the device's own use; and responsive to determining that the device has not collected enough entropy for the device's own use, requesting entropy from an entropy broker.

In another aspect, an embodiment of an entropy broker is disclosed. The claimed embodiment comprises, inter alia, a processor operably coupled to a memory; an entropy receiving module that receives entropy from a first client; and an entropy request fulfillment module that receives a request for entropy from a second client that is different from the first client and provides a given amount of received entropy to the second client.

In another aspect, an embodiment of a device is disclosed. The claimed embodiment comprises, inter alia, a processor operably coupled to a memory; a communications system operably coupled to the processor; and an entropy manager that provides entropy to applications operating on the device, the entropy manager further performing at least one of a group of actions comprising sending excess entropy to an entropy broker and requesting entropy from the entropy broker. Further features of the various embodiments are as claimed in the dependent claims. Benefits and advantages of the embodiments will be apparent in view of the following description and accompanying figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 3 illustrates elements of a queue of requests for entropy according to an embodiment of the present disclosure;

FIG. 4 illustrates the thresholds that are used to determine the amount and type of entropy that is provided to a consumer of entropy according to an embodiment of the present disclosure;

DETAILED DESCRIPTION OF THE DRAWINGS

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to one or more subscribers. As such, some network elements may be disposed in a wireless/wireline telecommunications network or a cable provider network whereas other network elements may be disposed in a public packet-switched network infrastructure (e.g., the Internet or worldwide web, also sometimes referred to as the Cloud), private packet-switched network infrastructures such as Intranets and enterprise networks, as well as service provider network infrastructures, any of which may span or involve a variety of access networks and core networks in a hierarchical arrangement. Where digital content or assets are consumed by the subscribers, network elements hosting such digital content or assets may be disposed in suitable content delivery network (CDN) infrastructures. Accordingly, some network elements may comprise "multiple services network elements" that provide support for multiple network-based functions.

Figure 1:
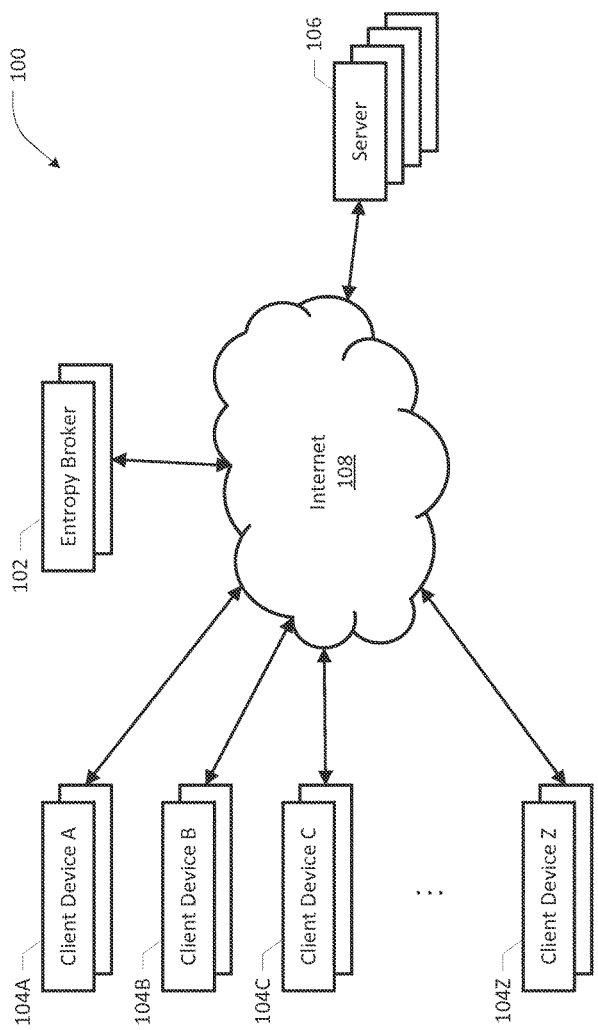
FIG. 1 depicts a system for sharing entropy according to an embodiment of the present disclosure.
Figure 2A:
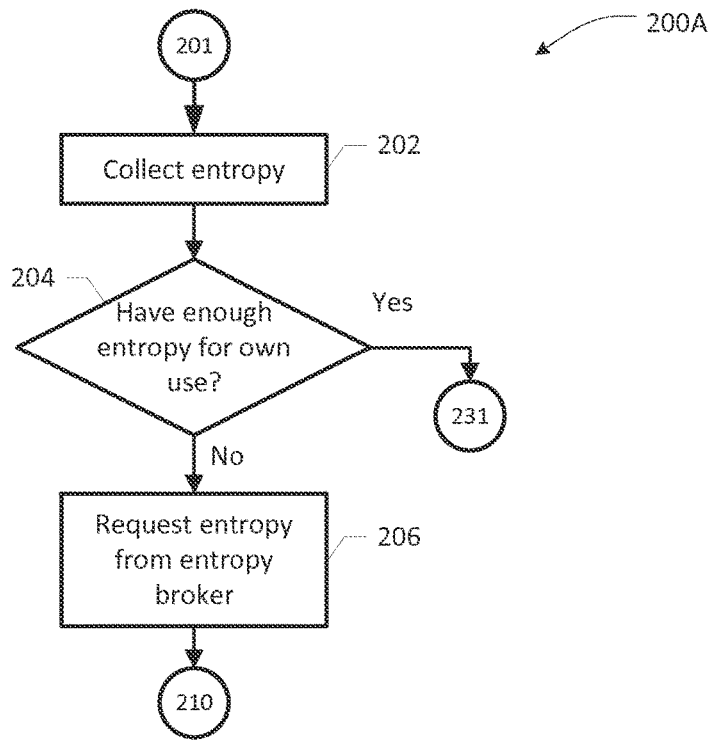
FIGS. 2A-2D show a flowchart depicting a method for sharing entropy at a client device or server according to an embodiment of the disclosure.
Figure 2B:
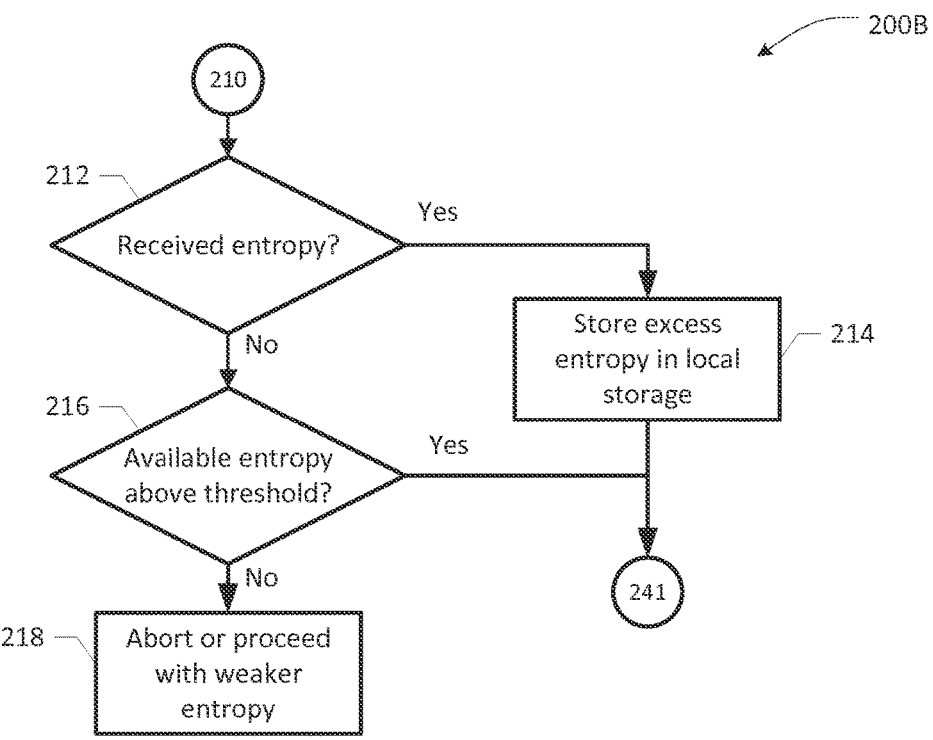
Figure 2C:
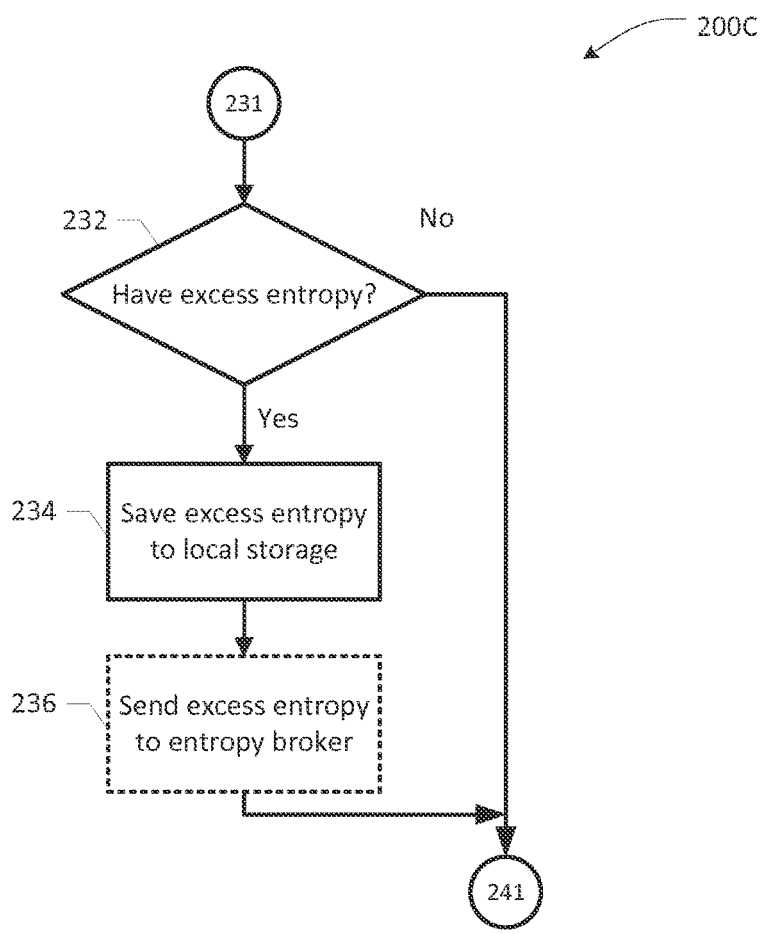
Figure 2D:
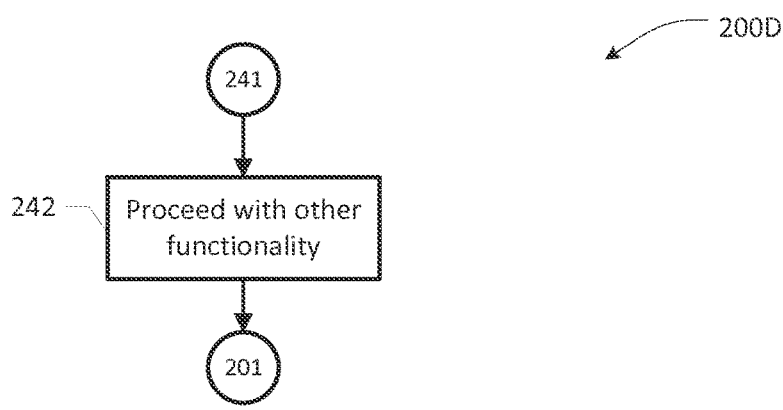
Figure 5A:
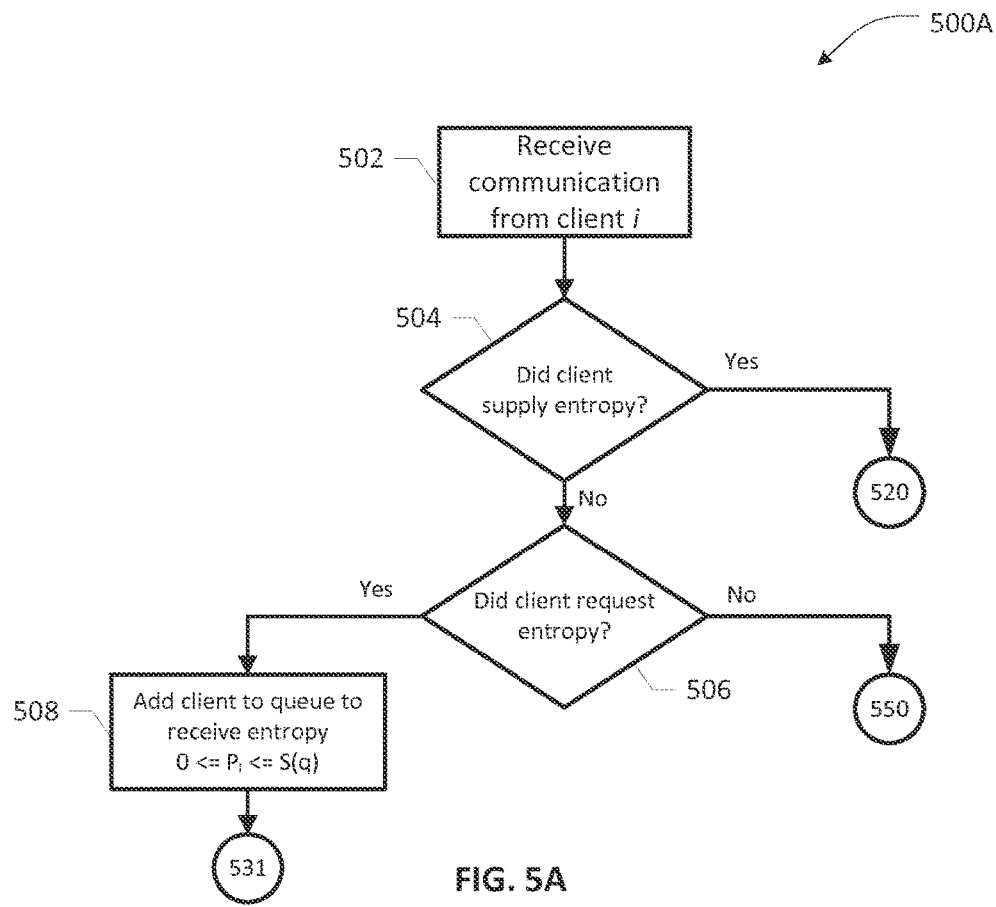
FIGS. 5A-5D show a flowchart depicting a method for sharing entropy at an entropy broker according to an embodiment of the present disclosure.
Figure 5B:
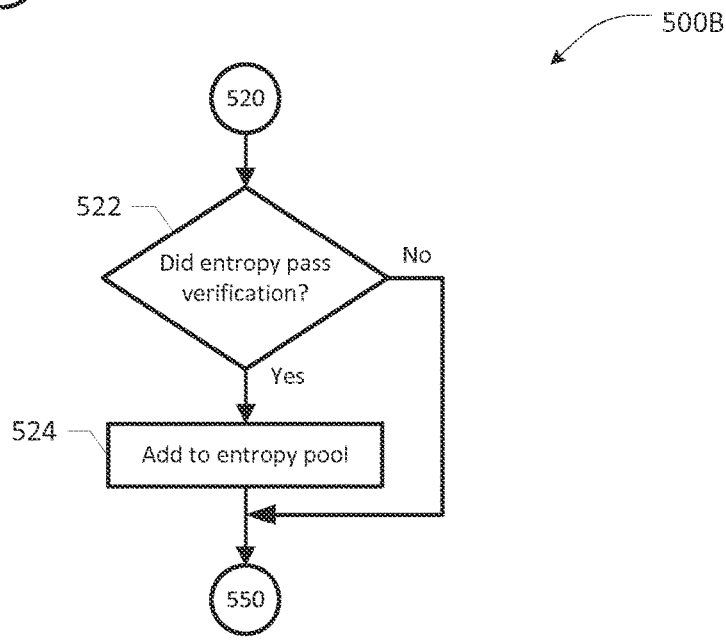
Figure 5C:
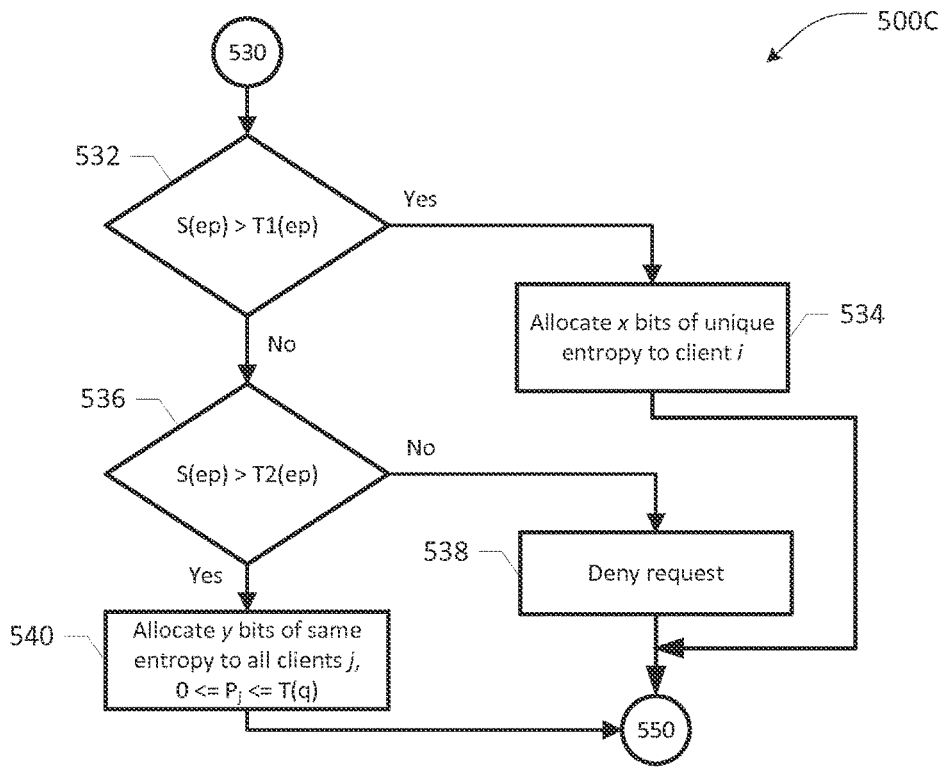
Figure 5D:
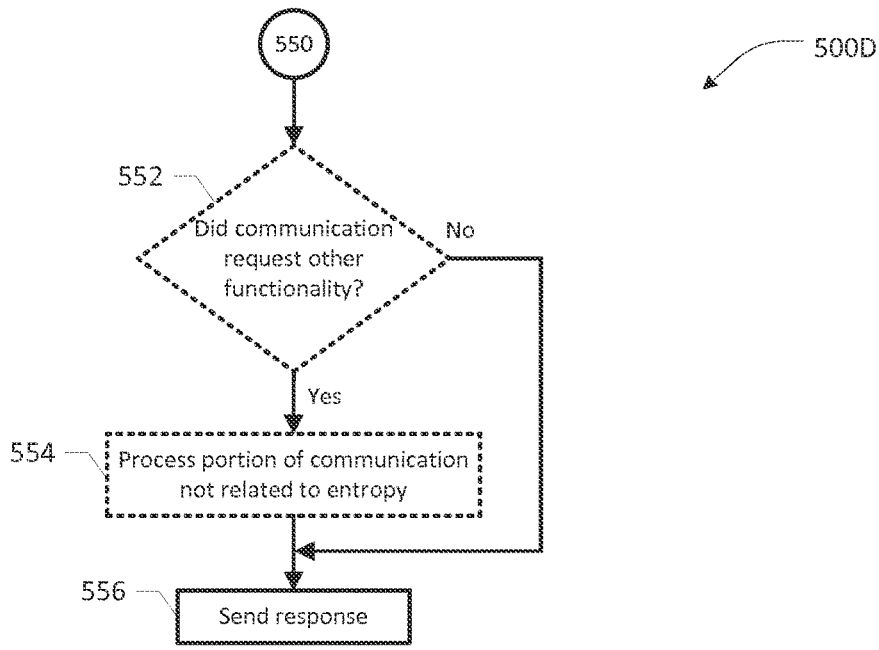

Turning to the figures now, FIG. 1 depicts a system 100 for sharing entropy wherein the present invention may be practiced. The system includes an Entropy Broker(s) 102, Client Devices 104 and Server(s) 106, which are connected to each other via the Internet (108). Client Devices 104A, 104B, 104C, 104Z may have widely varying capabilities and may include set-top boxes (STBs), TVs, personal/digital video recorders (PVR/DVRs), networked media projectors, portable laptops, netbooks, palm tops, tablets, smartphones, Voice Over Internet Protocol (VOIP) phones, mobile/wireless user equipment, portable media players, portable gaming systems or consoles (such as the Wii®, Play Station 3®, etc.), watches, connected glasses and the like that may access or consume content/services for purposes of one or more embodiments set forth herein. Server 106 can be stand-alone server; Server 106 may also be a cluster of servers or a server farm. Entropy Broker 102 can be a standalone system or may exist as part of an entropy farm; alternatively, Entropy Broker 102 can be co-located with a server or be a component running on a server farm. Client Devices 104 and Server(s) 106 send requests for more entropy or can send available entropy to Entropy Broker 102 and, if needed, receive additional entropy from Entropy Broker 102.

Entropy Broker 102 is configurable with rules that assist the entropy broker with the distribution of available entropy among client devices and servers. Although the simplest approach to distribution is providing entropy on a first-come-first-serve basis, such an approach may not be the best practice. In at least one embodiment, Entropy Broker 102 is configured to prefer servers over client devices, since servers generate content encryption keys which have high value and thus need good entropy. Not all client devices are created equal; accordingly, in at least one embodiment, Entropy Broker 102 is configured to prefer certain types of client devices over others. Client devices capable of receiving and playing back higher bitrate content may need better entropy due to the higher value of the content they receive, e.g., a tablet vs. a smart watch. Another decision dimension is the overall protections that a client device offers against attackers. For example client devices that provide less protection, e.g., an Android phone, may require better entropy than a device having better protection, e.g. an STB. In at least one embodiment, client devices signal their capabilities, e.g. make, model, operating system and its version, to the entropy broker, while the entropy broker consults internal configurable rules to make its decisions.

As mentioned previously, Entropy Broker 102 can be co-located with Server or Server farm 106. In at least one embodiment, Entropy Broker 102 is co-located with a DRM server. Such co-location allows client devices to not only send separate requests to Entropy Broker 102, but client devices can also piggyback these requests on existing requests already going to the DRM server for other reasons, such as device registration and license acquisition.

When multiple entropy brokers are provided, it is important to consider the load on Entropy Broker 102 in receiving entropy from clients. One way to handle the load is to load-balance incoming client requests among multiple entropy brokers based on client information, such as unique client identifiers or session cookies contained in client requests. A load balancer (not specifically shown) that is front-ending a farm of entropy brokers can use the client information as-is or can apply a hashing function to these unique values and route incoming requests from the same client to the same broker. Alternatively, the load balancer can monitor any of utilization, entropy pool and input queue size of all available entropy brokers to route requests based on how busy or idle the entropy brokers are or on how much entropy each has available. A combination of these metrics can also be used. A user communication that includes only a request for entropy does not receive any advantage from always being handled by the same entropy broker. However, when a communication from a client device includes both an action involving entropy and a request that is unrelated to entropy, it can be advantageous to send the communication to the same entropy broker each time, unless the broker is not able to handle the request in a timely manner. A load balancer can, for example, route all incoming requests from a client to the same broker unless utilization of that broker is above a first threshold or the broker's entropy pool is below a second threshold or the broker's input queue size is longer than a third threshold. If a request from a client needs to be re-assigned to a new broker, the load balancer can select the least busy broker with the most available entropy.

FIGS. 2A-2D depict the logical flow within a given entropy consumer/supplier. Each server or client device knows its own capabilities, the quality of the random number generator that is available, and the availability and permission to use other sources of random data, such as camera, GPS, special-purpose RNGs, etc. Each entropy consumer also knows whether it is allowed to proceed if the device is unable to obtain strong entropy. In one embodiment, a server absolutely requires strong entropy, while client devices may have to operate with only weak entropy in some instances in order not to degrade end-user experience. For example, an application that is streaming older, less valuable movies can start out with weak entropy and build stronger entropy over time as more entropy becomes available in the overall system. In one embodiment, an application built on the same technology, but which is providing premium content can decide to abort rather than proceed with weaker entropy. In at least one embodiment, method 200 executes in a separate thread to ensure that entropy is available before the entropy is required.

Method 200 illustrates a flow for sharing entropy at a server or a client device according to an embodiment of the disclosure. Method 200A begins with the device collecting entropy (202). As noted earlier, entropy can be collected from many hardware-related events, such as mouse movements, keystrokes, and the timing between interrupts and disk I/O. Entropy can also be collected from physical devices, such as a microphone, accelerometer, camera, etc. A device 104, 106 determines (204) whether the device currently has enough entropy for the device's own use. If the device determines that there is enough entropy, the method moves to location 231, where further processing occurs. If the device determines that there is not enough entropy for current use, the device requests (206) entropy from an entropy broker and proceeds to location 210.

Method 200B picks up at location 210 for devices that have requested entropy from Entropy Broker 102. The device determines whether the requested entropy has been received (212) in a timely manner. If the requested entropy has been received, the device can store (214) any excess entropy in local storage, where the entropy will be available for use by any application running on the device; processing then continues at location 241. If the requested entropy has not been received, the method determines (216) whether the available entropy is above a selected threshold. If the available entropy is above the selected threshold, the device can proceed to element 241. If the available entropy is not above the selected threshold, an application that requires the entropy can either abort (218) or proceed with weaker entropy (218) according to a current configuration. If the application is proceeding with weaker entropy, processing can continue at location 241 (not specifically shown).

Method 200C begins at location 231, after the device has determined that there is enough entropy for the device's own use. The device next determines (232) whether there is excess entropy. If there is excess entropy, the device securely saves (234) excess entropy to local storage. Periodically or when a configurable amount of entropy has accumulated in local storage, the device can send (236) excess entropy to the entropy broker. This block is shown as optional, as it will not necessarily be performed every time excess entropy is stored. Whether or not the device has excess entropy, the method then proceeds to location 241. Method 200D begins at location 241 whether or not the device has requested entropy. The device proceeds (242) with other functionality that may be necessary or desirable, then returns to location 201 to continue monitoring the need for and availability of entropy.

When requests for entropy are received at an entropy broker, such as Entropy Broker 102, the entropy broker cannot allow one or a handful of clients to hog all available entropy, but must maintain fairness among clients. For that reason all entropy requesting clients are placed into a queue and are given entropy only if the broker's supply of entropy is above a certain threshold. As mentioned earlier, the entropy broker can give priority to certain clients, and thus this queue can be weighted based on the capabilities of each incoming client and the rules preconfigured at the entropy broker. The entropy broker knows the available entropy and the number of clients requesting entropy and can gauge the supply and demand ratio. Based on that knowledge, the entropy broker can advise clients on what their acceptable weak entropy threshold should be if the broker is unable to supply them with more entropy. Thus clients lacking their own high-quality entropy can start with weak entropy and the entropy broker can build the client's entropy up over time. This can be viewed as a "slow-start" mechanism. Additionally, various strategies can be utilized at the entropy broker to offer greater flexibility in providing entropy, as will be explained below.

FIG. 3 depicts a queue of clients waiting at the entropy broker for entropy, with each block representing a client in the queue. The elements shown are as follows:

S(q)—The size of the input queue at time t, i.e., the number of clients in the queue waiting to receive entropy, with the first client at position 0;

T(q)—A threshold within the input queue, which has a configurable value greater than or equal to zero; and $P_i$—The position of client i in the input queue at time t. The size of queue S(q) varies over time, while threshold T(q) is configurable ahead of time.

Similarly, FIG. 4 depicts the entropy broker's entropy pool, i.e. the entropy that is available for sharing, with each block representing a given amount of available entropy. The elements shown are as follows:

S(ep)—Size of entropy pool at time t;

T1(ep)—A configurable threshold within the entropy pool. If available entropy drops below this threshold but remains above T2(ep), all clients with position $P_i$, such that $P_i \leq T(q)$ receive the same entropy; and T2(ep)—A configurable threshold within the entropy pool, with T2(ep)≥0. If available entropy drops below this threshold, no clients receive entropy.

The size of the pool S(ep) varies over time, as new entropy is introduced or provided to clients. In this specific example, T2(ep)<S(ep)<T1(ep), but it will be understood that S(ep) could also be larger than T1(ep) or smaller than T2(ep).

The operation of Entropy Broker 102 will now be discussed with regard to FIGS. 5A-5D, which depict the processing of communications received at the entropy broker. In the embodiment illustrated in these figures, Entropy Broker 102 is co-located with Server 106, which is, e.g. a server that provides video to clients. In this embodiment, client requests can be for any of the following scenarios:

Normal processing, e.g. to request video content information or a playback license;

A request for more entropy;

A communication that supplies the entropy broker with client's excess entropy; or Entropy-related requests piggybacked onto normal processing requests.

It will be recognized that when the entropy broker is not co-located with a server, then a "client" for the entropy broker can be either a client device 104 or a server 106, since both client devices and servers may request entropy. It will further be recognized that a client cannot be supplying excess entropy and at the same time asking for more entropy.

Method 500A begins with receiving (502) a communication from a client, which in this example is client i. The entropy broker determines (504) whether the client has supplied entropy to the broker. If the client has supplied entropy, the method will proceed to element 520 for processing of the supplied entropy. If the client has not supplied entropy, the entropy broker determines (506) whether the client is requesting entropy. If the client is requesting entropy, the entropy broker adds (508) the client to the queue at position $P_i$, then proceeds to element 531 where the entropy broker will determine how much entropy to allocate to client i. The position of client i is between position 0 and S(q). If the client did not request entropy, the method moves to element 550 for further processing.

Method 500B begins with element 520, which receives clients that are supplying entropy to the broker. Even though every precaution is taken to store locally and transport to the entropy broker the entropy collected on a client device in a secure fashion, an attacker can compromise the data that is collected and that is believed to be random. The application that collects entropy uses Application Programming Interfaces (API) provided by the client device/platform to access sources of random data, such as microphone, camera, GPS, etc. On some client devices, an attacker may obtain root access and inject their own code between the platform API and the entropy-collecting application, thereby feeding non-random data to the entropy broker. Further, an attacker may be using some physical means such as temperature or EM radiation to affect entropy-generating sources, without having to run any additional code on the client device. For that reason, the entropy broker should verify entropy data submitted by clients.

The entropy broker will perform verification tests on the supplied entropy to determine the entropy's validity. There are well-known tests that can be run on input data to verify whether that data is random or not. Such tests are performed to ensure that an attacker is not feeding known information to the entropy broker for the attacker's own purposes. In at least one embodiment, the chi-square test is used to test input data for randomness. In at least one embodiment, other tests for randomness are used, e.g., the Kolmogorov-Smirnov test, a serial-correlation test, etc. The chi-square test is very sensitive to errors in pseudorandom sequence generators. In one embodiment, Entropy Broker 102 calculates the chi-square distribution for the stream of bytes received from a client and reports the result as both an absolute number and as a percentage indicating how frequently a truly random sequence would exceed the value calculated. That percentage indicates the degree to which the sequence of bytes submitted by the client may be non-random. The actual values for "acceptable" randomness can be configurable.

Additionally, another check is used to verify that previously submitted entropy is not repeated. This check requires that previous values received from a client are stored in a cloud data store and that new values are checked against older values to detect repetition. One method of doing this is to use statistical sampling together with a distance measurement to detect similarity between the strings of entropy using a measure such as the Sorensen Index or Hamming Distance. In at least one embodiment, Entropy Broker 102 outsources the verification of data received from client devices to a cloud-based verification engine; this allows the process to be scaled up with the demand. Once the verification tests are performed, the entropy broker determines whether the provided entropy passed (522) the verification. If the received entropy passed the verification, the entropy is added to the entropy pool; otherwise this element is skipped. The method then moves to element 550 for final processing of the communication.

Method 500C begins at element 530, where the allocation of entropy to clients in the queue is considered. Entropy Broker 102 determines (532) whether the size of the available entropy is greater than the first entropy pool threshold, $T1(ep)$. If $S(ep) > T1(ep)$, the amount of available entropy is large enough that each requesting client can be given some amount of unique entropy. Thus, the entropy broker allocates (534) x bits of unique entropy to client i. In an ideal situation, the server never reuses a portion of entropy. However, in situations where the entropy pool gets depleted, such as in high-demand scenarios (e.g. the start of a live Super Bowl broadcast when a large number of clients tune in), the entropy broker can provide the same entropy to a number of different clients. Keeping track of which clients received which entropy is undesirable, as such a process does not scale well. In at least one embodiment, the same entropy is provided to all clients who are currently within a threshold number from the head of the queue, i.e., for all clients j whose position $P_j$ within the input queue satisfies the following condition $0 <= P_j <= T(q)$. Accordingly, if $S(ep) < T1(ep)$, the entropy broker determines (536) whether the size of the entropy pool is greater than the second entropy pool threshold $T2(ep)$. If $S(ep) > T2$, the entropy broker allocates y bits of duplicate entropy to each client that has a queue position less than or equal to $T(q)$. If the size of the entropy pool is less than the second threshold, i.e., $S(ep) < T2$, the entropy broker denies (538) the request, as it is unable to provide entropy to the client.

It should be noted that the values or x and y specified in the figure are such that y<x. Moreover, x and y can be used to express some policy relating both x and y to the amount of available entropy, the amount of entropy requested by clients, and also relating y to some minimum amount for robustness. In at least one embodiment, the entropy broker is able to determine the capabilities and protection level of the client device. In this embodiment, when the entropy broker is unable to provide entropy to a client, the entropy broker can notify a related server that is communicating with the client device of the state of entropy on the client device. In one example, Entropy Broker 102, Client Device 104 and Server 106 are all part of a network in which Server 106 is supplying video to Client Device 104. If Entropy Broker 102 is unable to provide Client Device 104 with high quality entropy, Entropy Broker 102 notifies Server 106 that the client device is operating with weak entropy. The response of Server 106 can be based, for example, on the quality of video that is being requested by Client Device 104. If the client device is watching premium content, Server 106 may decide to deny delivery of the premium content until the entropy is strong. If, however, the client device is watching less valuable content, Server 106 may decide to provide the content to the client device, even though the entropy is weak, and allow time for the entropy to be strengthened. Regardless of the amount of entropy allocated or not, the method then moves to element 550 for final processing.

Method 500D begins at element 550, when any provided entropy or request for entropy has been handled. The entropy broker determines (552) whether the communication received from the client requested other functionality. If other functionality was requested, the entropy broker processes the portion of the communication that is not related to entropy. It should be noted that elements 552, 554 are only performed when Entropy Broker 102 is co-located with Server 106, such that the clients may combine communications that are related to entropy with communications that are unrelated. In other situations, these elements are not performed. In at least one embodiment, Entropy Broker 102 is co-located with a DRM server. In this embodiment, a client may combine entropy-related communications with other communications, such as device registration and license acquisition. The final step of method 500D is sending (556) a response to the client. Depending on the nature of the communication, the response may include an acknowledgement of entropy received, an allocation of entropy, a denial of request for entropy and/or unrelated communications.

In addition to the operations disclosed in the figure, the entropy broker can maintain a recycle pool of entropy. The recycle pool can be populated with entropy that has already been used, and from which the entropy pool can be refreshed by combining one or more elements of the recycle pool via a mathematical operation, such as addition.

Figure 6:
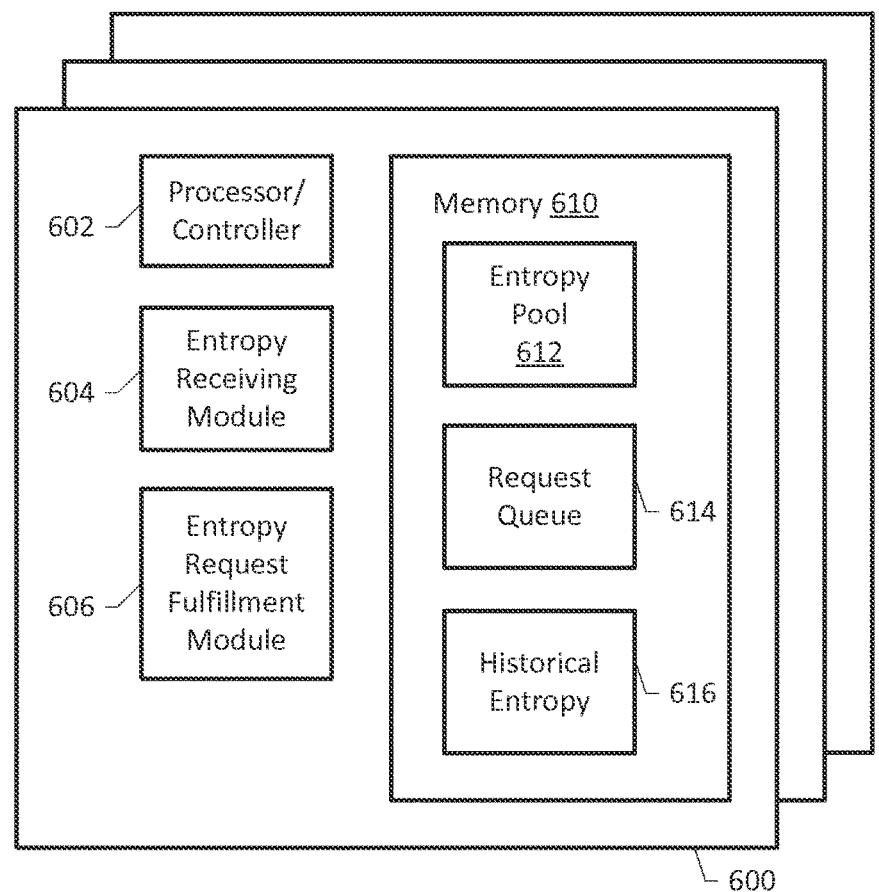
FIG. 6 depicts an entropy broker according to an embodiment of the present patent application.

FIG. 6 depicts an entropy broker 600 according to an embodiment of the present disclosure. Entropy broker 600 includes Processor/Controller 602 and Memory 610. Memory 610 can comprise any computer-readable storage media, e.g., magnetic disks, optical disks, random access memory, read-only memory, flash memory devices, phase-change memory, etc. Memory 610 has space available for Entropy Pool 612, Request Queue 614 and Historical Entropy 616. Historical Entropy 616 can include entropy that has been provided to one or more clients, but which is being stored, e.g., for comparison with new entropy received from a client or for recycling of the entropy when the pool is low. Entropy Broker 600 also contains Entropy Receiving Module 604, which receives excess entropy from clients, performs verification of the received entropy and attends to properly storing the entropy until needed and Entropy Request Fulfillment Module 606, which receives requests for entropy from clients, queues the requests according to priority, monitors the availability of entropy and either allocates entropy to a user or denies the request. Entropy Receiving Module 604 and Entropy Request Fulfillment Module 606 can be embodied as any of hardware, firmware and software stored in Memory 610. As previously mentioned, Entropy Broker 600 can be a stand-alone network node or group of nodes or can be co-located with one or more servers. Further, Entropy Broker 600 can be part of an entropy broker farm that is operable to provide entropy to a large number of clients.

Figure 7:
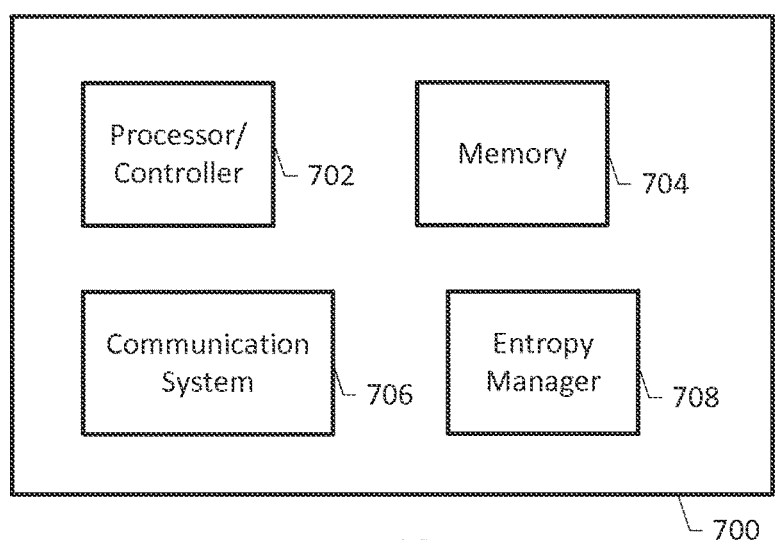
FIG. 7 depicts a generalized client of the entropy broker according to an embodiment of the disclosure.

FIG. 7 depicts a generalized client (700) according to an embodiment of the present patent application. Client 700 may be a server that requires entropy from an entropy broker; client 700 may also be a client device that can request entropy, provide entropy, or perform both actions at appropriate times. Client 700 includes Processor/Controller 702 and Memory 704. Depending on the embodiment, Memory 704 can comprise any computer-readable storage media, e.g., magnetic disks, optical disks, random access memory, read-only memory, flash memory, phase-change memory, etc. Client 700 also contains Communication System 706, which provides communications with other entities outside the client, and Entropy Manager 708. Entropy Manager 708 can be embodied as any of hardware, firmware and software stored in Memory 704. Additionally, Entropy Manager 708 can perform some or all of the functions shown in FIG. 2. That is, Entropy Manager 708 may collect and store entropy for the device's own use. If excess entropy is available, Entropy Manager 708 may securely store and send the excess entropy to an entropy broker, either periodically or when a threshold amount of entropy has been collected. Entropy Manager 708 may recognize situations in which Client 700 does not have adequate entropy for the client's own use and may request entropy from an entropy broker and provide the received entropy to applications on the client.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for sharing entropy, the method comprising:
receiving, at an entropy broker, a communication from a client;
responsive to determining that the client provided entropy, processing the provided entropy, wherein processing the provided entropy comprises
testing the provided entropy for randomness,
the entropy broker determining whether the provided entropy passes verification, and
if the entropy passes verification, adding the provided entropy to an entropy pool; and
responsive to determining that the client requested entropy, adding the client to an entropy queue.

2. The method as recited in claim 1 wherein testing the provided entropy for randomness comprises performing one of a chi-square test, a Kolmogorov-Smirnov test and a serial correlation test.

3. The method as recited in claim 1 wherein determining whether the provided entropy passed verification further comprises testing the provided entropy for repetition of previously received entropy from the client.

4. The method as recited in claim 3 further comprising using a digital rights management system for securely transporting and storing the entropy.

5. A method for sharing entropy, the method being operable at an entropy broker and comprising:
receiving a communication from a client;
responsive to determining that the client provided entropy, processing the provided entropy;
responsive to determining that the client requested entropy, adding the client to an entropy queue; and
for a client in the entropy queue,
determining whether the amount of entropy available at the entropy broker is greater than a first threshold, and
if an amount of entropy available at the entropy broker is greater than a first threshold, allocating a first amount of unique entropy to the client.

6. The method as recited in claim 5 further comprising, for a client in the entropy queue:
if the amount of entropy available at the entropy broker is less than or equal to the first threshold, determining whether the amount of entropy available is greater than a second threshold and responsive to determining that the amount of entropy is greater than a second threshold and that the client is in a position in the queue that is below a queue threshold, allocating a second amount of duplicate entropy to the client; and
responsive to determining that the amount of entropy is less than the second threshold, denying the request for entropy.

7. The method as recited in claim 6 further comprising:
responsive to determining that the communication requested other functionality, processing a part of the communication not related to entropy; and
sending a response to the client.

8. The method as recited in claim 6 further comprising:
determining whether a demand for entropy is high; and
responsive to determining that the demand is high, recycling previously used entropy by combining one or more elements of a recycle pool of entropy via a mathematical operation.

9. The method as recited in claim 7 further comprising prioritizing recipients' requests based on at least one of a group comprising a client type, client capabilities, and protection available on the client.

10. The method as recited in claim 7 wherein the entropy broker is aware of the quality of entropy available on a client and provides information to a server regarding data to be delivered to the client.

11. The method as recited in claim 7 further comprising limiting an amount of entropy that a given client can receive in a given time period.

12. A method for sharing entropy, the method being operable at a client device and comprising:
securely collecting entropy at the client device from physical devices on the client device;
determining whether the client device has collected enough entropy for the client device's own use;
responsive to determining that the client device has not collected enough entropy for the client device's own use, requesting entropy from an entropy broker;
determining whether the client device has excess entropy;
responsive to determining that the client device has excess entropy, securely storing the excess entropy on the client device; and
responsive to determining that a configurable amount of entropy has accumulated in local storage, securely sending the excess entropy to an entropy broker.

13. The method as recited in claim 12 wherein a request for entropy includes a make, model, operating system (OS) and OS version of the client device.

14. The method as recited in claim 12 further comprising:
determining whether the requested entropy has been received; and
responsive to determining that the requested entropy has been received, securely storing excess entropy on the client device.

15. The method as recited in claim 14 further comprising:
responsive to determining that the requested entropy has not been received, determining whether the available entropy is greater than a threshold; and
if the available entropy is not greater than the threshold, performing one of a group of actions comprising aborting a process that requires the entropy and proceeding with a weaker entropy, the performing being based on a current configuration of the client device.

16. The method as recited in claim 12 wherein one of excess entropy and a request for entropy is sent as part of a request for other services.

17. An entropy broker, comprising:
a processor operably coupled to a memory;
an entropy receiving module that receives entropy from a first client, tests the provided entropy for randomness, determines whether the provided entropy passes verification, and if the entropy passes verification, adds the provided entropy to an entropy pool; and
an entropy request fulfillment module that receives a request for entropy from a second client that is different from the first client and provides a given amount of received entropy to the second client.

18. A client device comprising:
a processor operably coupled to a memory;
a communications system operably coupled to the processor; and
an entropy manager that securely collects entropy from physical devices on the client device, provides entropy to applications operating on the device, responsive to determining that a configurable amount of excess entropy has accumulated in local storage, securely sends the excess entropy to an entropy broker and responsive to determining that the client device has not collected enough entropy for the client device's own use, requests entropy from the entropy broker.

\* \* \* \* \*